(12) United States Patent
Gout et al.

(10) Patent No.: US 12,147,552 B1
(45) Date of Patent: Nov. 19, 2024

(54) SYSTEMS AND METHODS FOR PRECISE SENSITIVE DATA DETECTION

(71) Applicant: United Services Automobile Association (USAA), San Antonio, TX (US)

(72) Inventors: Michael Peter Gout, San Antonio, TX (US); Christopher Edward Flores, San Antonio, TX (US); Benjamin James Nadeau, San Antonio, TX (US); Fredrick William Rodgers, Northlake, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 267 days.

(21) Appl. No.: 17/455,150

(22) Filed: Nov. 16, 2021

Related U.S. Application Data (60) Provisional application No. 63/115,961, filed on Nov. 19, 2020.

(51) Int. Cl.
G06F 21/62 (2013.01)
(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 9,306,917 | B2 * | 4/2016 | Brugger | G06F 21/60 |
| 10,445,324 | B2 * | 10/2019 | Arasan | G06F 16/2457 |
| 10,489,462 | B1 * | 11/2019 | Rogynskyy | G06F 16/906 |
| 11,670,406 | B2 * | 6/2023 | Kakhovsky | G16H 10/60 705/3 |
| 11,797,705 | B1 * | 10/2023 | Voinea | G06F 21/6245 |
| 2015/0161397 | A1 * | 6/2015 | Cook | G06F 21/60 726/26 |
| 2019/0228171 | A1 * | 7/2019 | Mathur | G06F 21/6218 |
| 2020/0293680 | A1 * | 9/2020 | Navarro-Dimm | H04L 63/0421 |

FOREIGN PATENT DOCUMENTS

EP 1560394 A1 * 8/2005 ............. G06Q 40/04

* cited by examiner

*Primary Examiner* — Christopher A Revak
(74) *Attorney, Agent, or Firm* — Fletcher Yoder, PC (57) ABSTRACT

Embodiments of the present disclosure include systems and methods for scanning for and identifying sensitive data in unexpected locations of data storage structures. Once sensitive data is found in unexpected locations of data storage structures, actions can be taken to remediate the unexpected storage of the sensitive data.

19 Claims, 11 Drawing Sheets

FNAME: Jane
MNAME: Emily
LNAME: Doe

SEX: F
MS: M
BPNUMBER: 1234567890
FHPNUMBER: 9876543210

| KNOWN_DATA_FORMAT_NAME | KNOWN_DATA_FORMAT_TYPE | KNOWN_DATA_FORMAT_PATTERN | KNOWN_DATA_FORMAT_EXAMPLE |
|---|---|---|---|
| EMAIL_FULL | TEXT | [FNAME][LNAME] + "@" + "." + ".com" | jane.doe@f1.com |
| GENDER_WORD1 | TEXT | SEX:M = "Male" \| SEX:F = "Female" | Female |
| MARITAL_STATUS_WORD1 | TEXT | MS:S = "Single" \| MS:M = "Married" \| MS:D = "Divorced" | Married |
| NAME_FIRST | TEXT | [FNAME] | Jane |
| NAME_FIRST_INIT_LAST | TEXT | [FNAME] + " " + [MI] + " " + [LNAME] | Jane[*][E][*]Doe |
| NAME_FIRST_LAST | TEXT | [FNAME] + " " + [LNAME] | Jane Doe |
| NAME_FIRST_MID_LAST | TEXT | [FNAME] + " " + [MNAME] + " " + [LNAME] | Jane Emily Doe |
| NAME_FIRST_PERIOD_LAST | TEXT | [FNAME] + "." + [LNAME] | jane.doe |
| NAME_LAST | TEXT | [LNAME] | Doe |
| NAME_LAST_COMMA_FIRST | TEXT | [LNAME] + "," + [FNAME] | Doe, Jane |
| PHONE_BUS_FULL | NUMBERS | [BPNUMBER] | 1234567890 |
| SEG_PHONE_BUS_FULL | TEXT | [BPNUMBER 0:2] + "-" + [BPNUMBER 3:5] + "-" + [BPNUMBER 6:9] | 123[*]456[*]7890 |
| PHONE_BUS_SHORT | NUMBERS | [BPNUMBER 3:9] | 4567890 |
| PHONE_HOME_FULL | NUMBERS | [HPNUMBER] | 9876543210 |
| PHONE_HOME_SHORT | NUMBERS | [HPNUMBER 3:9] | 6543210 |

SYSTEMS AND METHODS FOR PRECISE SENSITIVE DATA DETECTION

CROSS-REFERENCE TO RELATED APPLICATIONS

The present application claims priority to and the benefit of U.S. Provisional Application No. 63/115,961, entitled "SYSTEMS AND METHODS FOR PRECISE SENSITIVE DATA DETECTION" and filed on Nov. 19, 2020, the disclosure of which is incorporated by reference herein for all purposes.

TECHNICAL FIELD

The present disclosure relates generally to systems and methods for detecting sensitive data in data source. More specifically, the present disclosure relates to utilizing known sensitive data of a sample to identify sensitive data in database tables, electronic documents, and/or other electronic data sources.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In an ever-increasing data-driven world, data storage structures are becoming increasingly complex, enabling an increase of areas where sensitive data may be stored. Unfortunately, as these data storage structures become more complex, the ability to track information stored in these data storage structures has also become more complex. In many instances, fields specified in data storage structures are mis-used, causing sensitive data to be stored in unexpected locations that are not regulated in a manner that fields known to storage sensitive data are.

In some systems, sensitive data detection may rely on pattern matching and/or meta data searching to identify sensitive data. Unfortunately, these approaches oftentimes fail to detect sensitive data and/or identify data as sensitive data that is not actual sensitive data (e.g., false positive). For example, pattern matching may look for known data formats to identify potential sensitive data. However, this approach may result in false positives, flagging data that is in a sensitive data format as sensitive data, even when the data does not actually pertain to sensitive data. For example, if a user's social security number (e.g., 477-57-8177) is sensitive data, a pattern matching technique may identify data (e.g., 123-45-6789) with a similar format (e.g., 3 numbers, 2 numbers, and 4 numbers separated by dashes) as sensitive data, even though this data does not match the user's actual social security number. Therefore, a false positive may be generated.

Furthermore, metadata scanning may also be used to identify potential sensitive data. Under this approach, metadata associated with fields of data is searched to identify potential sensitive data. While this technique may capture entire swaths of potential sensitive data, much sensitive data may be missed, as this approach relies heavily on predictable/expected metadata in the data storage structures. For example, a database column name, such as "SSN", may indicate sensitive data. Metadata searching may look for column names including "SSN" and flag the entire column as sensitive data. However, when the metadata does not descriptively indicate the sensitive data, such as a column name of "MEMO", the column may not be flagged, even when the "MEMO" field includes sensitive data, such as stored social security numbers.

Accordingly, new sensitive data identification approaches are desirable. Such solutions are described in detail herein.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The systems and methods provided herein relate to scanning for and/or identifying sensitive data in unexpected locations of data storage structures. Once sensitive data is found in unexpected locations of data storage structures, actions can be taken to remediate the unexpected storage of the sensitive data.

In particular, the current systems and methods scan entire data storage structure records associable with a particular user for the presence of defined variants of known sensitive data of the particular user. In this manner, a precise indication of a sensitive data particular to the user may be identified as present in particular records of a data storage structure. This results in an understanding of where the user's sensitive data is being stored, without creating false positives from data that may look like sensitive data but is not particular to the user. This approach may be repeated for an entire sample population, resulting in an understanding of how and where sensitive data is stored in the data storage structures, even when in unpredictable and/or unexpected locations.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

Figure 1:
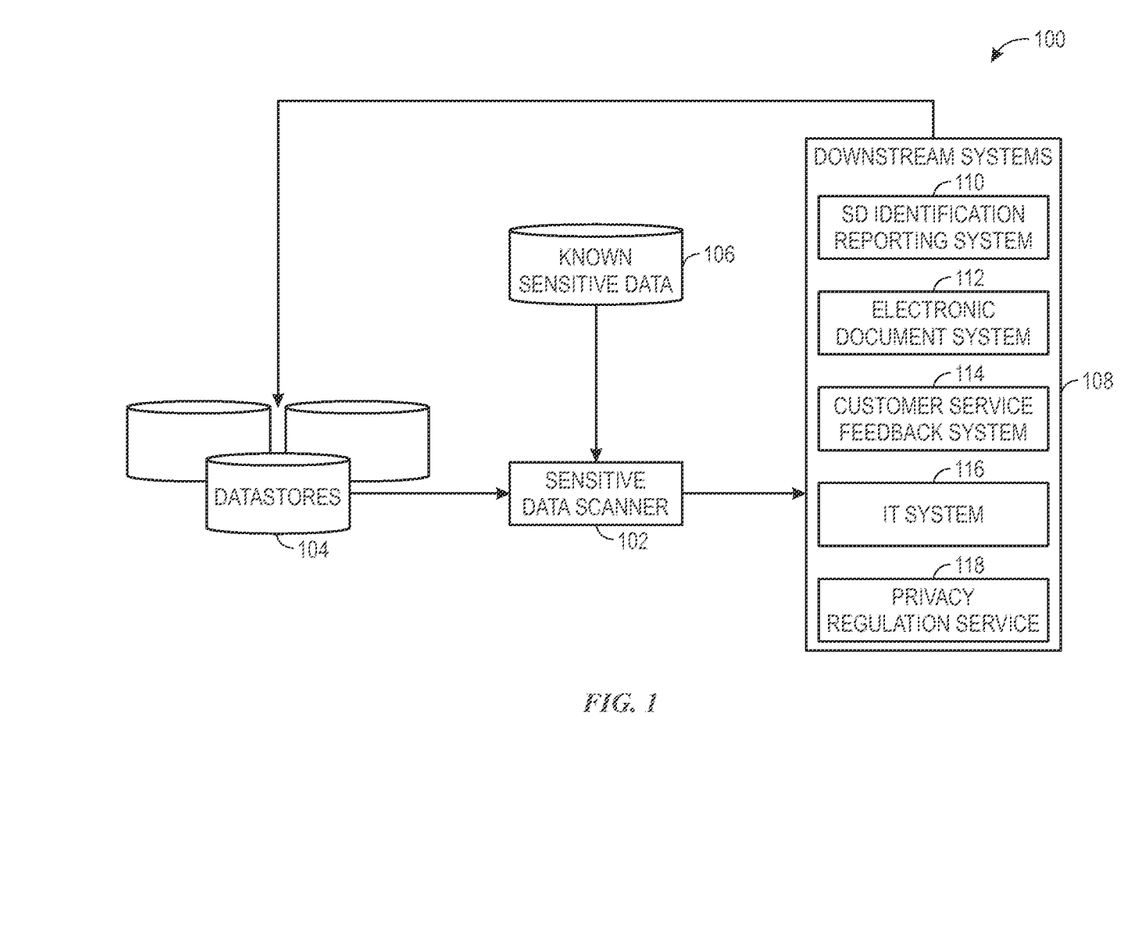
FIG. 1 is a schematic diagram, illustrating a system for scanning for sensitive data, in accordance with an embodiment.

Turning now to an overall system flow for scanning for sensitive data, FIG. 1 is a schematic diagram, illustrating a system 100 for scanning for sensitive data, in accordance with an embodiment. The system 100 includes a sensitive data scanner system 102 that scans one or more datastores 104 (e.g., a database, electronic document, etc.) for sensitive data. As mentioned above, the sensitive data scanner 102 may utilize known sensitive data 106 to identify sensitive data stored in the datastores 104.

To scan for sensitive data, the sensitive data scanner 102 may identify a subset of the known sensitive data 106 associated with particular entities of a sample population. The sensitive data scanner 102 may identify all data store structures (e.g., database tables, electronic document fields, etc.) that can be joined/associated with particular entities of the sample population. For each entity of the sample population, the subset of the known sensitive data 106 that is associated with the entity is searched in all records associated with the entity in all of the data store structures. In this manner, precise sensitive data identification particular to the entity may be performed.

In some instances, as described in more detail below, numerous variants of the sensitive data may be generated prior to the searching of the datastores 104. In this manner, the searching need not be dependent upon a rigid sensitive data format that the known sensitive data 106 is stored in. This may result in capture of additional sensitive data in the datastores 104, which may be stored in a format different than the known sensitive data 106. Example variants of known sensitive data are described in more detail with respect to FIG. 3.

Results of the sensitive data scanning by the sensitive data scanner 102 may be provided for use by downstream systems 108. For example, the downstream systems 108 may include a sensitive data identification reporting system 110, which may provide a graphical user interface (GUI) reporting identified sensitive data found in the datastores 104. A process for sensitive data identification and use in such a GUI is provided in FIG. 2. Further, an example of such a GUI is provided in FIG. 4.

Figure 5:
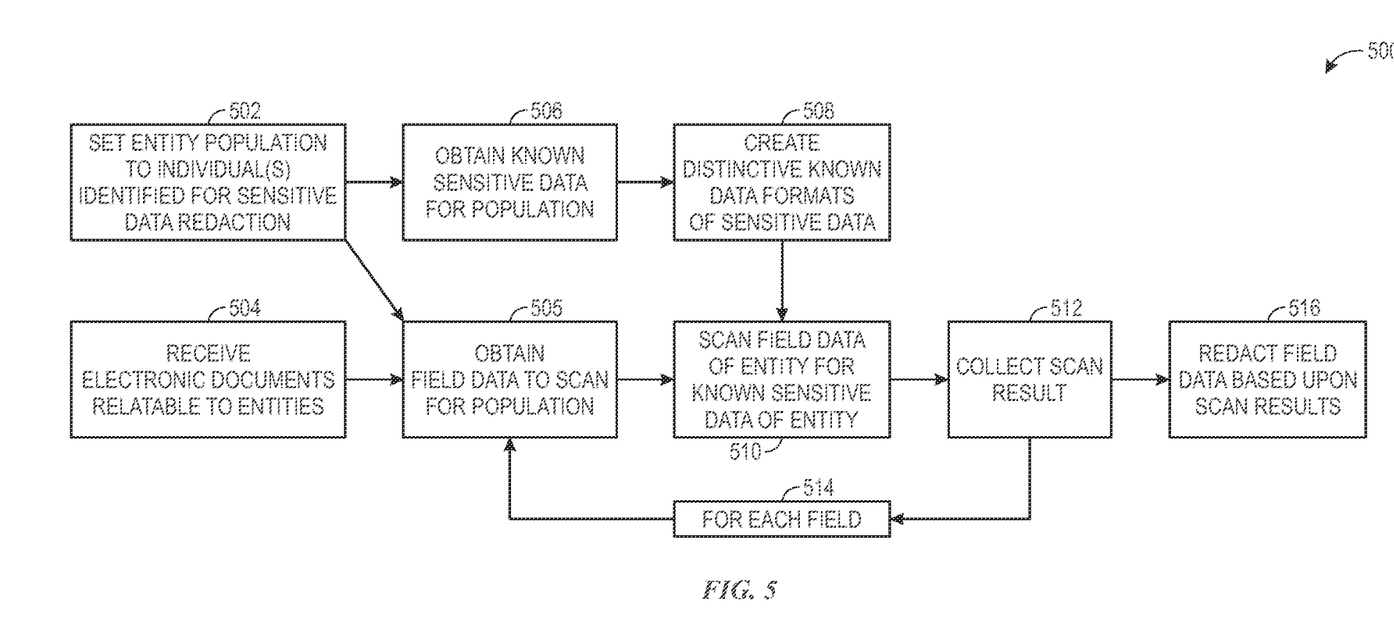
FIG. 5 is a flowchart, illustrating a process for scanning for and redacting sensitive data, in accordance with an embodiment.
Figure 6:
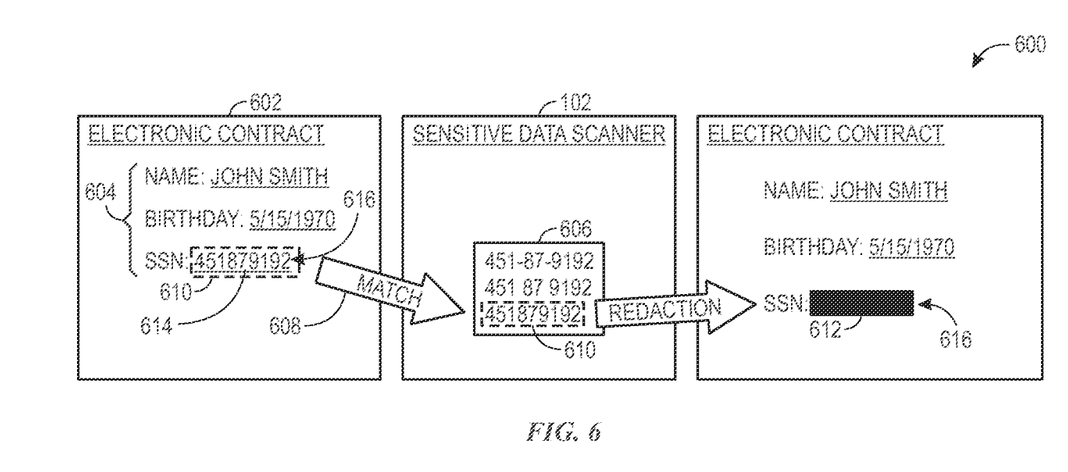
FIG. 6 is a schematic diagram, illustrating a redaction example, in accordance with an embodiment.

The downstream systems 108 may also include an electronic document system 112. A process for identifying sensitive data for use in an electronic document system 112 is described in detail in FIG. 5. Further, FIG. 6 illustrates an example implementation of the process of FIG. 5.

Figure 8:
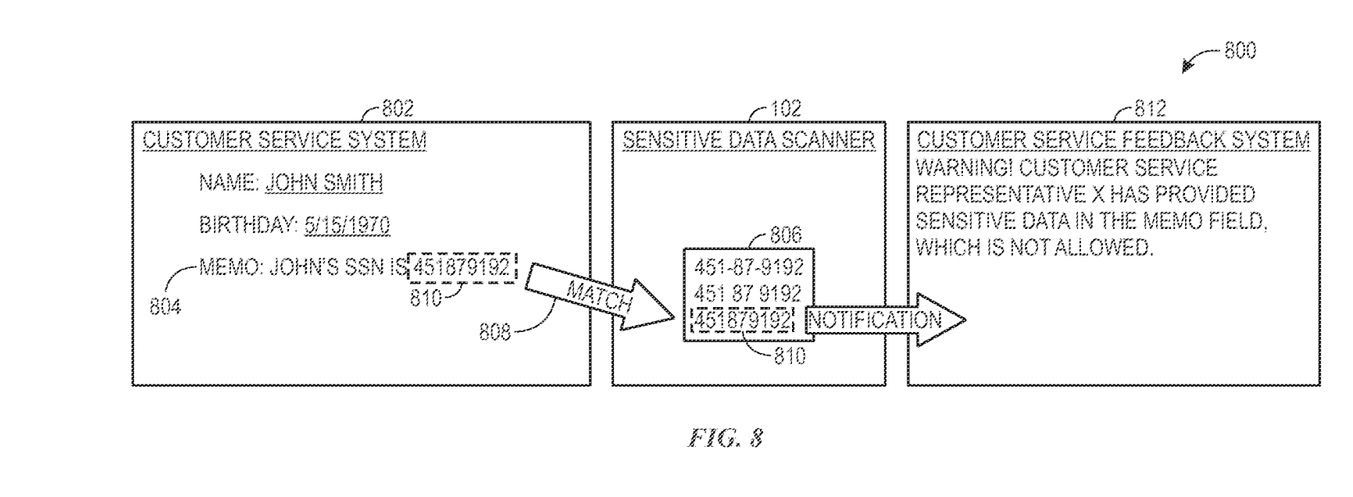
FIGS. 8 and 9 are schematic diagrams, illustrating examples of a table field use identification and reporting, in accordance with an embodiment.
Figure 9:
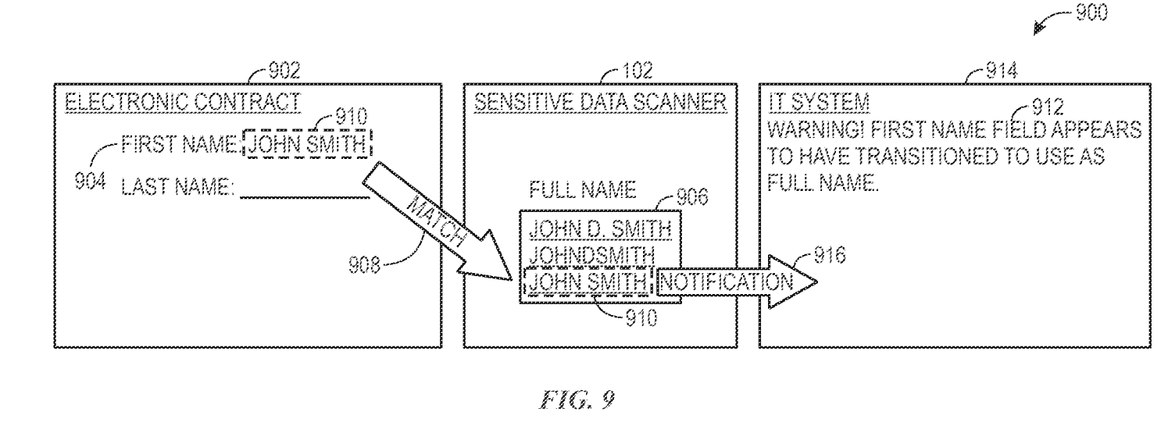

The downstream systems 108 may also include a customer service feedback system 114 and/or an Information Technology (IT) system 116, which may be interested in data store structure usage patterns. A process for identifying sensitive data for identify datastore structure usage patterns is described in detail in FIG. 7. Further, FIG. 8 illustrates an example implementation of the process of FIG. 7 in the context of a customer service feedback system 114 and FIG. 9 illustrates an example implementation of the process of FIG. 7 in the context of an IT system 116.

The downstream systems 108 may also include a Privacy Regulation Service 118. For example, the Privacy Regulation Service 118 may be charged with removal of sensitive data associated with a user from datastores 104. A process for identifying sensitive data for use in an electronic document system 112 is described in detail in FIG. 5. Further, FIG. 6 illustrates an example implementation of the process of FIG. 5.

Figure 2:
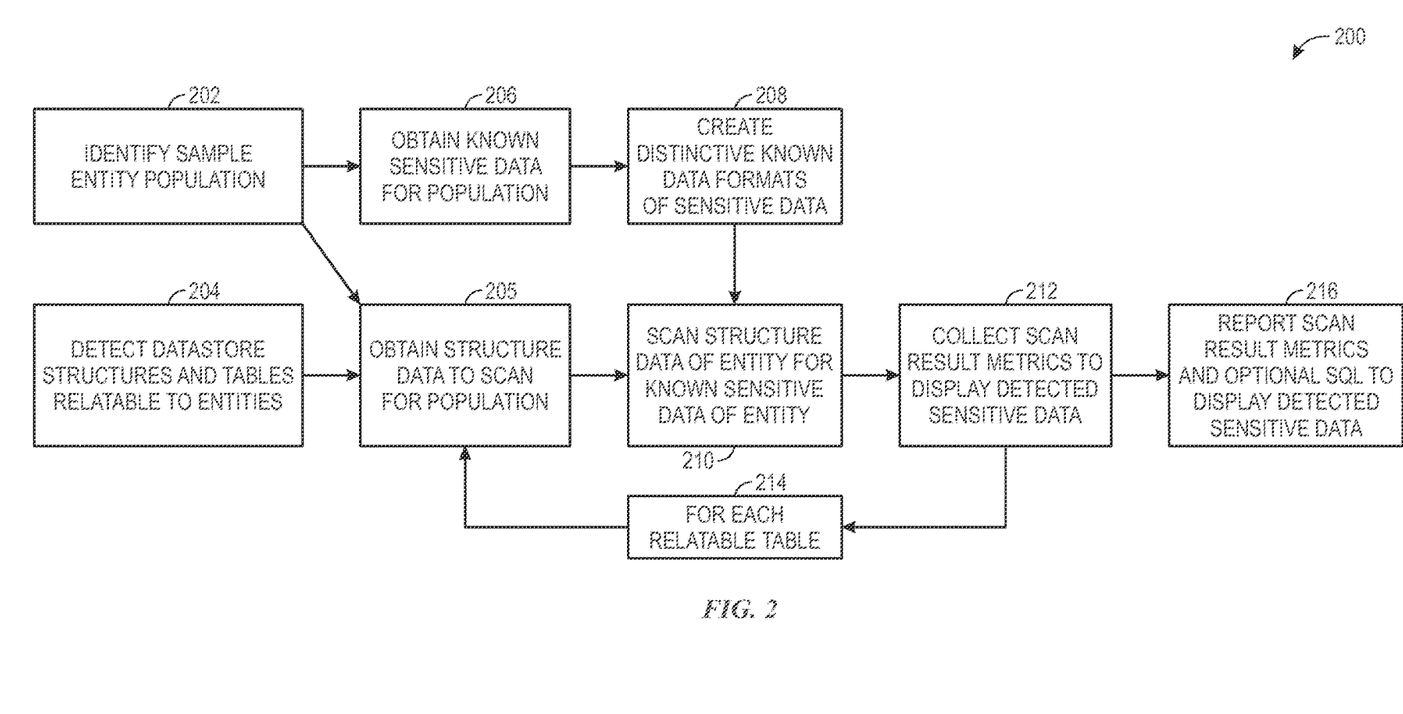
FIG. 2 is a flowchart, illustrating a process for scanning for and reporting sensitive data, in accordance with an embodiment.

Turning now to a more detailed discussion of the sensitive data scanning, FIG. 2 is a flowchart, illustrating a process 200 for scanning for and reporting sensitive data, in accordance with an embodiment. As mentioned above, the process 200 includes identifying a sample entity population (block 202). The sample size may dynamically change based upon a number of use cases. For example, a larger sample size may be used in situations where relatively larger computing resources are available. Further, in some use cases, the sample size could be as few as one entity. This may be particularly useful when performing a sensitive data scan for a single entity, such as in a use case where a particular entity (e.g., customer) has requested all sensitive data be deleted from the system 200.

In some embodiments, the entities used for the sample population may be selected based upon particular characteristics. For example, in some embodiments, it may be desirable to maintain a diverse population. For example, when a company offers many different products, a diverse population may be a population that has entities (e.g., customers) that cover an association with a vast number of the different products. This may help to insure that product-specific data sources are each scanned for at least a subset of sensitive data of the population. Further, in some embodiments, after the sensitive data scan process completes, it can be re-run (e.g., periodically at a user-provided time interval) with a different sample population. In some embodiments, the sample population size may dynamically change as certain variables change. For example, during periods when relatively less processing power is available (e.g., during business hours), the sample size may be relatively fewer than during periods when relatively more processing power is available.

The process includes detecting datastore structures (e.g., tables) that are relatable (e.g., joinable) to an identifier of the entity (block 204). For example, in the context of a relational database, the relationships defined in the relational database may indicate particular tables that can be associated with an entity field (e.g., a customer identifier). In other datastores, the structures may be identified based upon other features of the structures. For example, in an electronic document, an author or a signor may indicate an entity with which the fields of the electronic document may be related to.

The data (e.g., table data) associated with the detected datastore structures of block 204 may be obtained (block 205). This may be done, for example, by running a query that returns all data associated with unique identifiers of the sample entity population.

Known sensitive data for the population is obtained (block 206). For example, a database may include known sensitive data associated with unique identifiers that identify the entities. The known sensitive data associated with the sample population may be obtained by querying the datastore using the unique identifiers of the entities.

Once the known data is obtained, distinctive known data formats of the obtained sensitive data are created (block 208). For example, known sensitive data may be stored in a number of different formats. By creating the distinctive known data formats for the obtained sensitive data, each distinctive format of the known distinctive data may be searched.

Figure 3:
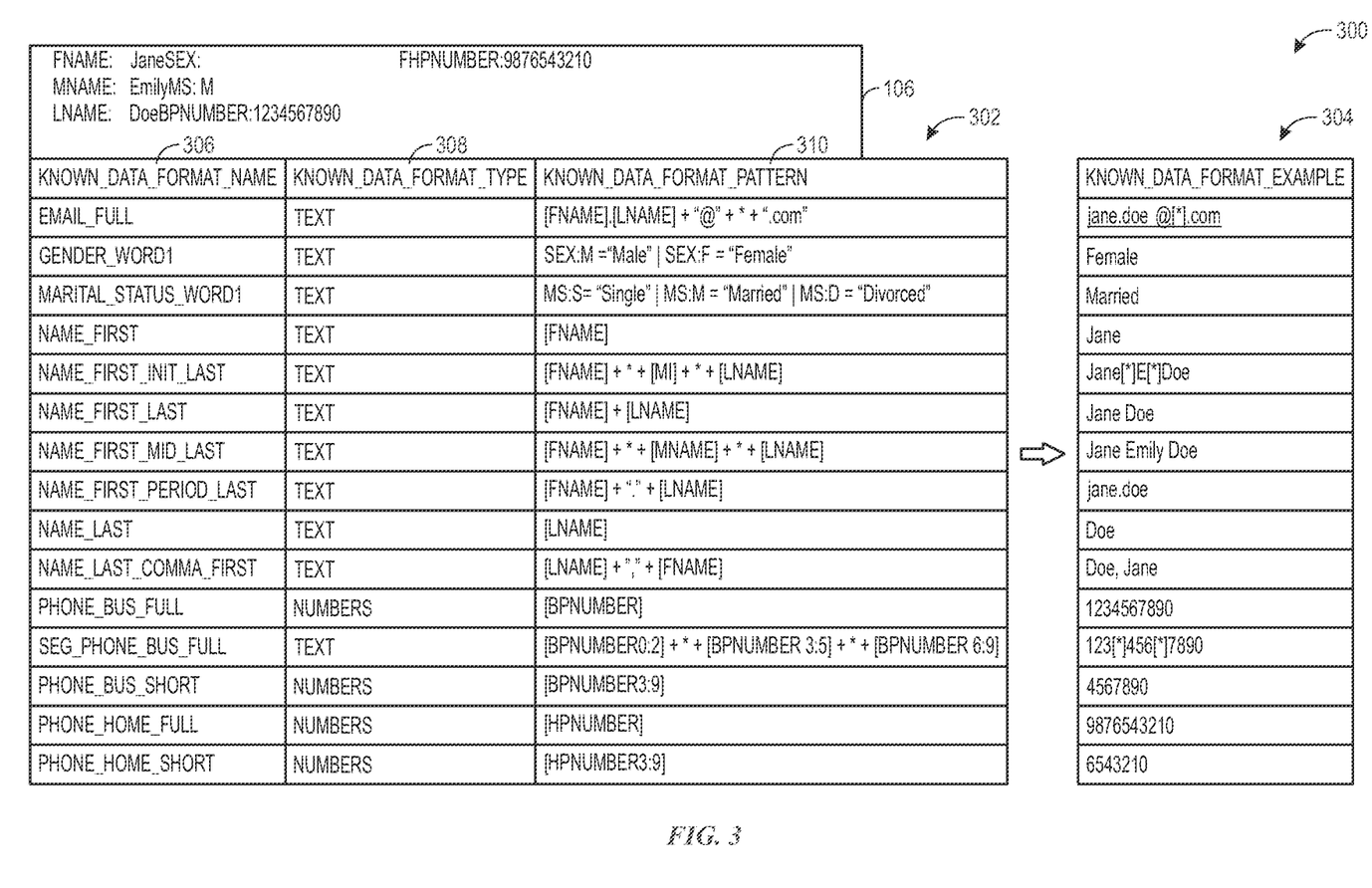
FIG. 3 is a schematic diagram, illustrating distinctive known data formats and example sensitive data transformed into these formats, in accordance with an embodiment.

FIG. 3 is a schematic diagram, illustrating examples 300 of distinctive known data rules 302 that result in creation of known sensitive data in a variety of distinctive formats 304. In the illustrated embodiment, the distinctive known data rules 302 include a name 306, a data type 308, and a pattern 310 for each of the rules 302. The name 306 provides a descriptive indication of the format. For example, "Email_Full" may indicate an email address with a full name included in the email address. The type 208 may indicate particular types of fields to search for the format (e.g., text fields, number fields, etc.). The pattern 310 may provide a pattern to generate a particular known data format a first name and last name separated by a period and any .com domain (e.g., as indicated by the wildcard symbol [*]). Example known sensitive information 106 for the entity is included in FIG. 3. When applied to the pattern 310, the known data format of "jane.doe@[*].com is generated, indicating a format of data that should be searched for in the datastore structures. In some instances, a mapping of one form of known sensitive data may be provided in the pattern 310. For example, the "MARITAL_STATUS_WORD1" rule maps MS:M to "Married", resulting in "Married" as the search term for "MARITAL_STATUS_WORD1. In some instances, the patterns 310 may segment portions of the known sensitive data to generate new formats. For example, "SEG_PHONE_BUS_FULL" segments the business phone number, "BPNUMBER" into an area code (e.g., the first three numbers (in positions 0, 1, and 2), pre-fix (e.g., the second three numbers (in positions 3, 4, and 5) and the post-fix (e.g., the last four numbers (in positions 6, 7, 8, and 9) by specifying ranges for the segments (e.g., 0:2, 3:5, and 6:9). Wildcards are inserted between the segments as denoted by the appended "*" between each of these ranges. This pattern results in "123[*]456[*]7890" when applied to the known sensitive data 106. This enables a search for all of the segments with intervening text between the segments. Accordingly, the presence of either "123-456-7890" or "123.456.7890" may result in identified sensitive data when the wildcards are used.

Returning to FIG. 2, once the distinctive formats of sensitive data are created in block 208 and the data of the datastore structures is obtained in block 205, the data of the datastore structures is scanned for the distinctive known data formats of the sensitive data (block 210). This is done iteratively for each entity and its corresponding known data in the variety of formats only on a portion of the data obtained in block 205 that pertains to the corresponding entity. Accordingly, each scan will compare data associated with an entity against that entity's own known sensitive data, reducing a number of false positives that may be experienced. For example, if a first entity is named "John" and has a dog named "Fred", "Fred" may not be sensitive data, as it is not personal identifying information (e.g., John's first name). Without limiting the scan to identifying information specific to John, Fred might be identified as a possible first name and flagged as sensitive data, causing a false positive. Further, if a second entity has the name of "Fred", when the scan is not limited to Fred's data, but instead also includes John's data, the mention of John's dog "Fred" may result in identifying possible sensitive information pertaining to Fred.

The scan results are collected for reporting of detected stored sensitive data (block 212). Further, as mentioned herein, scans are run for all data structures (e.g., tables) that are relatable to the entity (e.g., joinable to an Entity Identifier column). Once all scan results for all tables is complete, the scan results may be reported via a GUI (block 216). In some embodiments, SQL commands may also be presented that enable a user to quickly return datastore results where the sensitive data was found. As may be appreciated, some of this identified sensitive data may be expected. For example, it may be wholly expected that a customer name field includes "NAME_FIRST_LAST" sensitive data. However, there may be revelation of unexpected locations where sensitive data is stored as well. For example, the entry 414 relating to the "DEVICE_NM" column of a table may be intended to store an electronic device name. However, several instances of "NAME_FIRST_LAST" sensitive data is indicated as having been identified in this column. This may mean that an entity has set the name of their electronic device as their first and last name, which is sensitive data. As may be appreciated, this is very useful information, as it may help reveal unexpected datastore locations where sensitive data may be stored, even when the storage was not intended.

Figure 4:
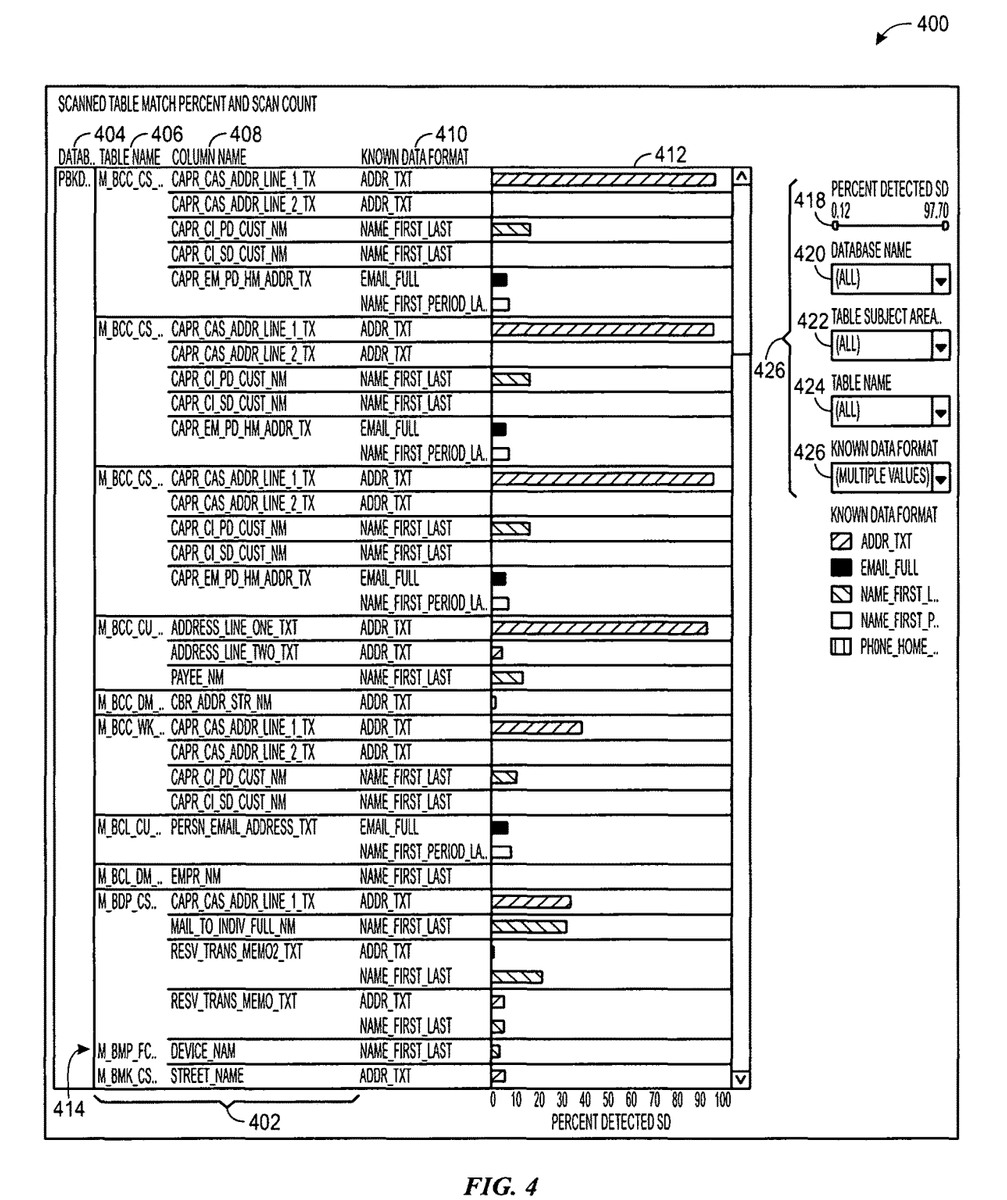
FIG. 4 is a schematic diagram, illustrating a reporting graphical user interface (GUI) displaying results of a sensitive data scan, in accordance with an embodiment.

The GUI 400 may include display filters 416, which may enable a user to home in on particular sensitive data criteria. For example, metric criteria 418 may enable only metrics that meet certain criteria to be displayed. In the current embodiment, the metric criteria includes a range of percentage of detected sensitive data within a given column of data. In addition, particular datastore structures of interest may be defined. For example, a particular database of interest may be defined at affordance 420, a particular table subject area may be defined by affordance 422, a particular table name of interest may be defined by affordance 424. When selected, only the items of interest will be displayed in the GUI 400. In some embodiments, an affordance 426 may be used to select one or more particular known data format names of interest. Thus, if a user of the GUI 400 was only interested in finding data pertaining to a phone number, only the phone number format names would be selected by the affordance 426.

FIG. 4 is a schematic diagram, illustrating a reporting graphical user interface (GUI) 400 displaying results of a sensitive data scan, in accordance with an embodiment. As illustrated in the GUI 400, the GUI 400 may include a specific location 402 (e.g., database 404, table name 406, and/or column name 408) where sensitive data has been identified by a scan. Further, an indication 410 of the particular known data format name (e.g., name 306 of FIG. 3) may be provided. Metrics 412 may illustrate a frequency of the observed identified known data. For example, in the current embodiment, the metrics 412 indicate a percentage of scanned records for the particular columns that include identified sensitive data.

Having discussed identification and reporting of stored sensitive data, the discussion now turns to other uses of identified sensitive data. FIG. 5 is a flowchart, illustrating a process 500 for scanning for and redacting sensitive data, in accordance with an embodiment. The process 500 is similar to the process 200, except that the sample is set based upon individuals identified for sensitive data redaction (block 502), the data store structure is specifically set to electronic documents in block 504, the data is electronic document field data in block 505, the known sensitive data formats created in block 508 are specific to known specific data to be redacted, electronic data fields are scanned in block 510, the scan is completed for each field in block 514, and rather than merely reporting results, electronic redaction occurs in block 516. Otherwise, the process 500 is quite similar to that of the process 200 of FIG. 2. Thus, the same system may be used to identify sensitive data in both of these processes 200 and 500.

To illustrate the effects of process 500, FIG. 6 is a schematic diagram, illustrating a redaction example 600, in accordance with an embodiment. Electronic document 602 includes a number of fields 604. Each of these fields 604 includes data associated with an Entity (e.g., John Smith). In the current redaction embodiment, known sensitive data formats of sensitive data may be generated exclusively for sensitive data to be redacted (e.g., here, social security numbers). The Sensitive Data Scanner 102 may generate and/or obtain these known sensitive data formats 606 and perform a search for the known sensitive data formats 606 in the fields 604 of the electronic document 602.

As indicated, by the "Match" arrow 608 and the dashed lines 610, a match has been found by the Sensitive Data Scanner 102 in the current example. This match results in a redaction 612 of the data 614 found in the matching field 616. In some embodiments, the redaction may be performed by calling a function of the electronic document 602 software that performs electronic redaction of the electronic document 602.

As with previous embodiments, the Sensitive Data Scanner 102 need not rely on a particular format of the social security number or a particular name of the fields 604 to identify the data to be redacted. Thus, data to be redacted may be redacted, even when the data is stored in an unintended and/or unexpected field, resulting in increased security and enhanced redaction. Further, to perform this redaction for multiple parties and/or multiple electronic documents 602, the sample may be set to all of the parties that the redaction should occur for and/or the datastore may be set to a multitude of electronic documents 602 that the redaction should occur on.

Figure 7:
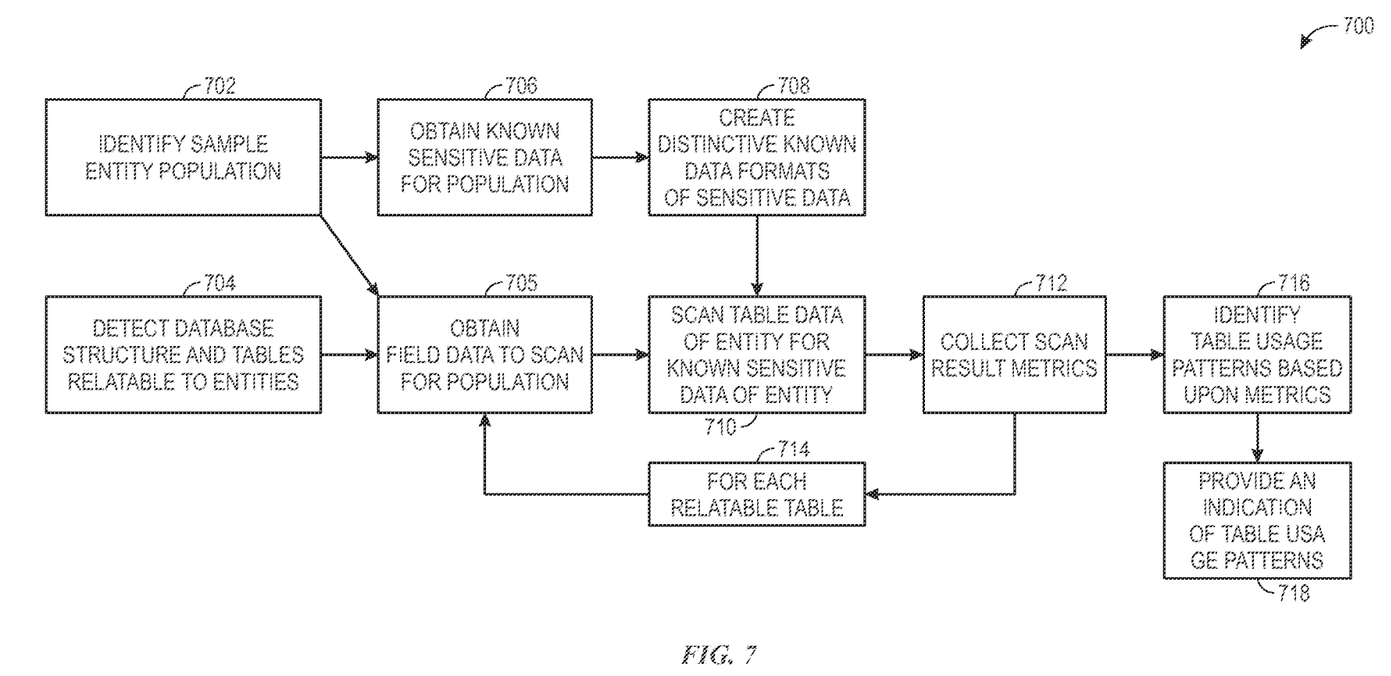
FIG. 7 is a flowchart, illustrating a process for scanning for sensitive data and identifying and/or reporting table usage patterns based upon the sensitive data, in accordance with an embodiment.

Turning now to detection of usage patterns of datastore structures, FIG. 7 is a flowchart, illustrating a process 700 for scanning for sensitive data and identifying and/or reporting table usage patterns based upon the sensitive data, in accordance with an embodiment. The process 700 is very similar to the process 200 of FIG. 2, except for the how the scan result metrics are used. In contrast to merely reporting scan results, as provided in block 216 of FIG. 2, the current process 700 identifies table usage patterns based upon the metrics (block 716) and provides an indication of the table usage patterns (block 718). For example, the scan results may indicate identified sensitive data in tables/fields that do not traditionally store sensitive data. In some instances, these tables/fields may be explicitly flagged (e.g., via electronic metadata) with an indication that sensitive data should not be stored in the table/field. In some cases, the indication may be based upon characteristics of the tables/fields. For example, there may be a security requirement (e.g., encryption) for tables/fields that include sensitive data. Accordingly, tables/fields that do not meet this requirement may be indicated as not allowing storage of sensitive data. Patterns of usage (e.g., stored sensitive data in tables/fields not intended to store sensitive data, increasing trend of identification of sensitive data in tables/fields, etc.) may be identified (e.g., based upon an increasing amount of sensitive data observed over time in historical scan results). Upon identifying the usage patterns they may be provided (e.g., via a GUI).

FIGS. 8 and 9 are schematic diagrams, illustrating examples 800 and 900 of table field usage pattern identification and reporting, in accordance with an embodiment. FIG. 8 illustrates example 800 of a customer service system 802 where customer service representatives provide information about customers that they interact with. In the current example, the customer service representative has entered "John's SSN is 451879192" in a memo field 804. The Sensitive Data Scanner detects a match between text in this field 804 and one of the known sensitive data formats 806, as indicated by the Match arrow 808 and the dashed lines 810. The memo field 804 may be a field indicated as not intended for use in storing sensitive data. Accordingly, a notification may be provided (e.g., to a Customer Service Feedback System 812 and/or the Customer Service System 802), indicating that sensitive data was identified as stored in the memo field 84, which is not allowed. As may be appreciated, this usage pattern may be quite beneficial, as it may help computer systems meet the regulatory requirements imposed by an organization, even when provision of sensitive data is unintended and/or an operator is unaware of the provision of the sensitive data in an unintended/restricted location.

FIG. 9 illustrates an additional usage pattern example 900. In the example 900 of FIG. 9, a usage pattern of storing an improper format of sensitive information has been observed. Here, an electronic contract 902 illustrates that a first name field 904 is populated with the full name "John Smith". While not restricted, this format of sensitive data may not be expected in the first name field 904, which may expect only FNAME. Accordingly, when the data in the first name field matches one of the full name sensitive data formatting types 906, which is not expected to be in the first name field 904

(e.g., as indicated by match arrow 908 and dashed lines 910), a warning notification 912 may be transmitted to a downstream system 914 (e.g., an IT system). This is represented by the notification arrow 916. In this manner, sensitive data that does not match a type of sensitive data expected in a particular field may be identified and when such sensitive data is stored in the field, an alert/notification may be presented, resulting in more reliable electronic data/data entry.

Figure 10:
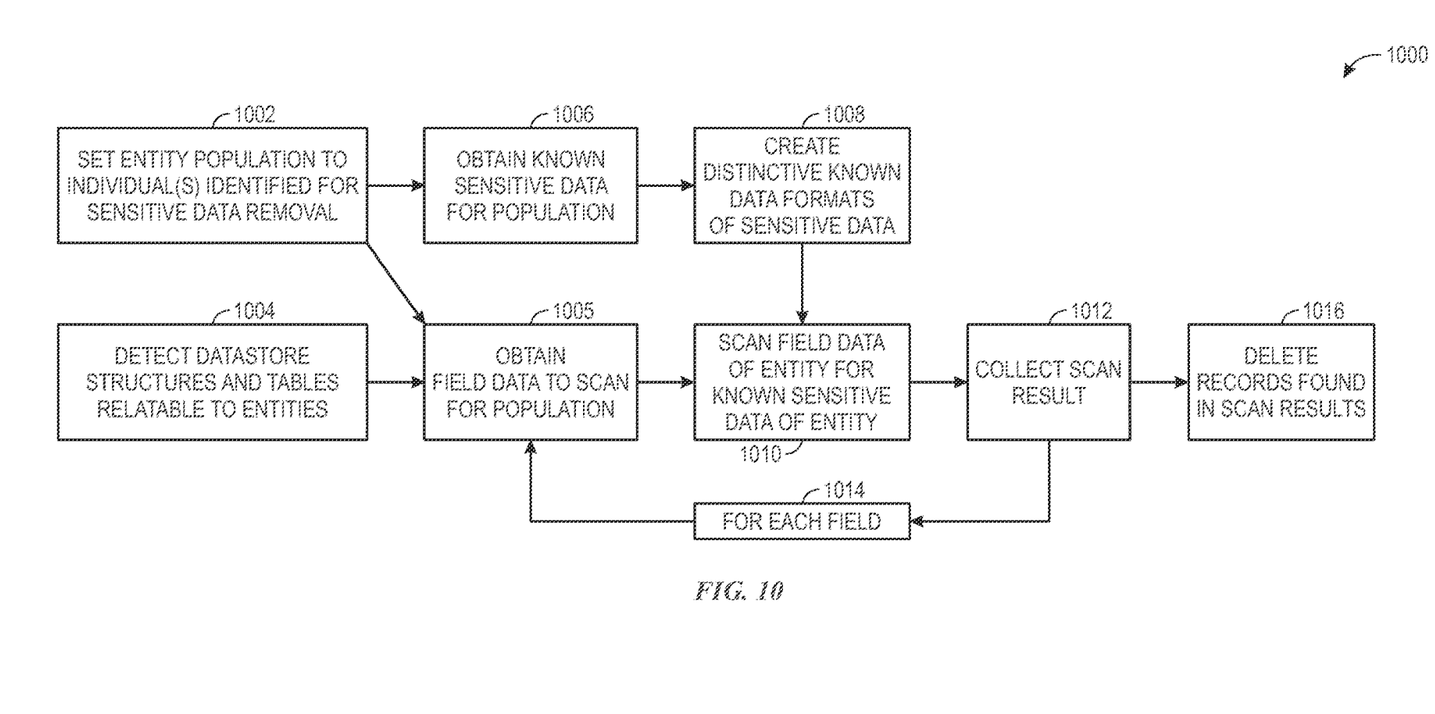
FIG. 10 is a flowchart, illustrating a process for scanning for and deleting sensitive data, in accordance with an embodiment.

Turning now to a discussion of regulation implementation, under some jurisdictional regulations, there may be requirements to delete stored sensitive data for a particular user upon request of the user. However, as may be appreciated, it may be difficult to identify sensitive data stored in unintended locations. FIG. 10 is a flowchart, illustrating a process 1000 for scanning for and deleting sensitive data, in accordance with an embodiment. The process 1000 is similar to the process 500 of FIG. 5, except that the entity population is set to individuals identified for sensitive data removal (block 1002) instead of individuals for sensitive data redaction (block 502), instead of receiving electronic documents in block 504, the process involves detecting datastore structures and tables relatable to entities (block 1004), and instead of redacting based upon scan results (block 516) records are deleted.

Figure 11:
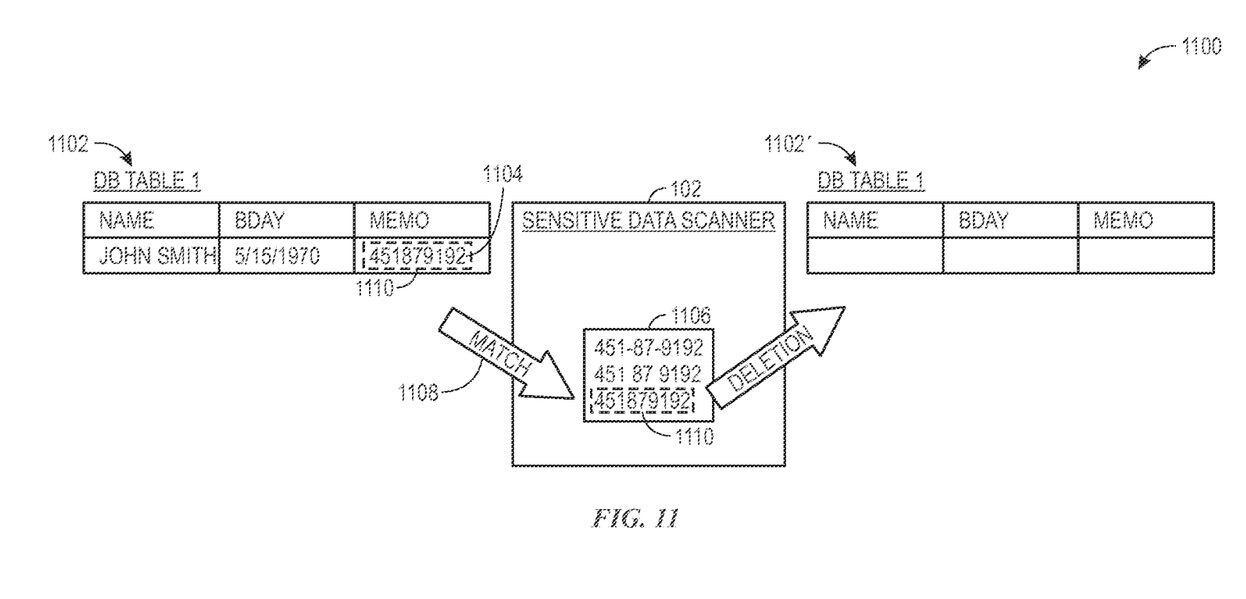
FIG. 11 is a schematic diagram, illustrating an example of sensitive data deletion, in accordance with an embodiment.

FIG. 11 is a schematic diagram, illustrating an example 1100 of sensitive data deletion, in accordance with an embodiment. Assume that customer John Smith has requested sensitive data to be removed from a computer system. As illustrated in DB Table 1 1102, the memo field 1104 may store John's sensitive data (e.g. a social security number). The Sensitive Data Scanner may identify this stored sensitive data by matching data in the memo field 1104 with one of the known sensitive data formats 1106, as indicated by match arrow 1108 and the dashed lines 1110. Upon identifying this stored sensitive information, the stored sensitive information may be deleted, as indicated by deletion arrow 1112. In some embodiments, an entire row of data may be deleted, while in other embodiments, only the stored sensitive data may be deleted. In the current example, as illustrated by DB Table 1 1102', an entire row of data associated with the stored sensitive data has been deleted.

As may be appreciated, the techniques provided herein provide a significant improvement in computer functionality, enabling the computer to seek out sensitive data in numerous formats, even in unexpected locations. This is something neither a computer nor a human could previously perform. Through reliance on defined data structure relationships, particular data records associated with particular entities may be searched, resulting in more precise identification of actual sensitive data, even in unintended/unexpected locations with fewer false positive identifications.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory, computer-readable medium, comprising computer-readable instructions that, when executed by one or more processors of a computer, cause the computer to:
   identify a sample entity population from a population of entity records in an electronic data system;
   obtain known sensitive data for the sample entity population;
   identify datastore structures relatable to the sample entity population;
   obtain search data stored in the datastore structures relatable to the sample entity population;
   for each entity in the sample entity population:
      scan a portion of the search data associated with the entity to identify a presence of a subset of the known sensitive data associated with the entity; and
      upon identifying the presence, store a datastore location associated with the presence a result of the scan; and
   provide an indication of the result of the scan in a graphical user interface (GUI) that provides an accumulation of identified sensitive data stored in the datastore structures, along with locations in the datastore structures where the identified sensitive data is stored.

2. The computer-readable medium of claim 1, comprising computer-readable instructions that, when executed by one or more processors of a computer, cause the computer to:
   create a plurality of distinctive known data formats of the known sensitive data; and
   perform the scan of the portion of the search data using a subset of the plurality of distinctive known data formats.

3. The computer-readable medium of claim 2, comprising computer-readable instructions that, when executed by one or more processors of a computer, cause the computer to:
   obtain a set of data patterns providing transformation rules for the known sensitive data; and
   generate the plurality of distinctive known data formats by transforming the known sensitive data in accordance with the transformation rules.

4. The computer-readable medium of claim 1, comprising computer-readable instructions that, when executed by one or more processors of a computer, cause the computer to:
   receive, via a user input in the GUI, a filtering criteria comprising: metric data criteria, a particular datastore, a particular table, a particular type of sensitive data, or any combination thereof; and
   filter the accumulation of identified sensitive data based upon the filtering criteria.

5. The computer-readable medium of claim 1, comprising computer-readable instructions that, when executed by one or more processors of a computer, cause the computer to:
   receive a request to redact information in an electronic document, the information pertaining to a particular entity;
   set the sample entity population to the particular entity; and
   provide the indication of the result of the scan to an electronic document software in the form of a redaction request that requests the electronic document software to redact fields, data, or both of the electronic document indicated in the indication of the results of the scan.

6. The computer-readable medium of claim 1, comprising computer-readable instructions that, when executed by one or more processors of a computer, cause the computer to:
   identify usage patterns of the datastore structures based upon the indication of the result of the scan; and
   provide the usage patterns to a downstream system for subsequent use.

7. The computer-readable medium of claim 6, wherein the downstream system comprises a system that uses the usage patterns to provide a notification that sensitive data was inputted into a location where sensitive data should not be inputted.

8. The computer-readable medium of claim 6, wherein the downstream system comprises a system that uses the usage patterns to provide a notification toward a trend of usage of a datastore structure location towards a different use over time, as observed based at least in part on historical scan results.

9. The computer-readable medium of claim 6, wherein the downstream system comprises a system that uses the usage patterns to provide a notification that sensitive data of first type has been inputted into a location where sensitive data of a second type different than the first type is expected.

10. The computer-readable medium of claim 6, wherein the downstream system comprises a system that uses the usage patterns to provide delete sensitive data associated with a particular entity.

11. A system, comprising:
a datastore comprising a plurality of structures configured to store data;
a downstream computer system;
a sensitive data scanner computer system, configured to:
identify a sample entity population from a population of entity records in an electronic data system;
obtain known sensitive data for the sample entity population;
create a plurality of distinctive known data formats of the known sensitive data;
identify a subset of the plurality of structures of the datastore that are relatable to the sample entity population;
obtain search data stored in the subset of the plurality of structures of the datastore that are relatable to the sample entity population;
for each entity in the sample entity population:
scan a portion of the search data associated with the entity to identify a presence of a subset of the distinctive known data formats of the known sensitive data that are associated with the entity; and
upon identifying the presence, store a datastore location associated with the presence a result of the scan; and
provide an indication of the result of the scan in a graphical user interface (GUI) that provides an accumulation of identified sensitive data stored in the datastore, along with locations in the datastore where the identified sensitive data is stored.

12. The system of claim 11, wherein the downstream computer system comprises a system that uses usage patterns derived from the indication of the result to provide a notification that sensitive data was inputted into a location where sensitive data should not be inputted.

13. The system of claim 11, wherein the downstream system comprises a system that uses usage patterns derived from the indication of the result to provide a notification toward a trend of usage of a datastore structure location towards a different use over time, as observed based at least in part on historical scan results.

14. The system of claim 11, wherein the downstream system comprises a system that uses the usage patterns to provide a notification that sensitive data of first type has been inputted into a location where sensitive data of a second type different than the first type is expected.

15. The system of claim 11, wherein the downstream system comprises a system that uses the usage patterns to provide delete sensitive data associated with a particular entity.

16. A computer-implemented method, comprising:
identifying a sample entity population from a population of entity records in an electronic data system;
obtaining known sensitive data for the sample entity population;
creating a plurality of distinctive known data formats of the known sensitive data;
identifying datastore structures relatable to the sample entity population;
obtaining search data stored in the datastore structures relatable to the sample entity population;
for each entity in the sample entity population:
scanning a portion of the search data associated with the entity to identify a presence of a subset of the distinctive known data formats of the known sensitive data associated with the entity; and
upon identifying the presence, storing a datastore location associated with the presence a result of the scan; and
provide an indication of the result of the scan in a graphical user interface (GUI) that provides an accumulation of identified sensitive data stored in the datastore structures, along with locations in the datastore structures where the identified sensitive data is stored.

17. The computer-implemented method of claim 16, comprising:
providing a notification that sensitive data was inputted into a location where sensitive data should not be inputted.

18. The computer-implemented method of claim 16, comprising:
providing a notification toward a trend of usage of a datastore structure location towards a different use over time, as observed based at least in part on historical scan results.

19. The computer-implemented method of claim 16, comprising:
using usage patterns derived from the indication of the result to provide a notification toward a trend of usage of a datastore structure location towards a different use over time, as observed based at least in part on historical scan results.

* * * * *